(12) United States Patent
Payne

(10) Patent No.: US 9,205,940 B2
(45) Date of Patent: Dec. 8, 2015

(54) TRAY SEALING APPARATUS AND METHOD

(75) Inventor: David William Payne, Lutterworth (GB)

(73) Assignee: ISHIDA EUROPE LIMITED, West Midlands (GB)

( * ) Notice: Subject to any disclaimer, the term of this patent is extended or adjusted under 35 U.S.C. 154(b) by 181 days.

(21) Appl. No.: 13/703,324

(22) PCT Filed: Jun. 10, 2011

(86) PCT No.: PCT/GB2011/051083
§ 371 (c)(1),
(2), (4) Date: Feb. 1, 2013

(87) PCT Pub. No.: WO2011/154744
PCT Pub. Date: Dec. 15, 2011

(65) Prior Publication Data
US 2013/0255852 A1   Oct. 3, 2013

(30) Foreign Application Priority Data

Jun. 11, 2010 (GB) .................................. 1009769.9
Aug. 20, 2010 (GB) .................................. 1013947.5

(51) Int. Cl.
*B32B 41/00* (2006.01)
*B65B 57/00* (2006.01)
(Continued)

(52) U.S. Cl.
CPC ................. *B65B 57/00* (2013.01); *B65B 7/164* (2013.01); *B65B 25/00* (2013.01); *B65B 51/14* (2013.01); *B65B 57/04* (2013.01); *B65B 59/04* (2013.01); *B29C 65/18* (2013.01); *B29C 65/787* (2013.01); *B29C 66/53461* (2013.01); *Y10T 156/1712* (2015.01)

(58) Field of Classification Search
CPC ........ B65B 7/164; B65B 43/48; B65B 51/18; B65B 57/04; B65G 2203/042; B29C 65/02
USPC ........... 156/64, 350, 351, 352, 358, 359, 360, 156/361, 363, 367, 368, 378, 379
See application file for complete search history.

(56) References Cited

U.S. PATENT DOCUMENTS

| 3,246,448 | A | 4/1966 | Amic, Sr. | |
| 2004/0098947 | A1* | 5/2004 | Konishi | ....................... 53/329.5 |

(Continued)

FOREIGN PATENT DOCUMENTS

| EP | 0680880 A1 | 11/1995 |
| EP | 1574431 A1 | 9/2005 |
| EP | 2052974 A1 | 4/2009 |

*Primary Examiner* — Michael N Orlando
*Assistant Examiner* — Joshel Rivera
(74) *Attorney, Agent, or Firm* — Singularity LLP

(57) ABSTRACT

The application relates to a twin lane tray sealer (100) comprising a pair of conveyors aligned with respective lanes for conveying trays to a heat sealing tool (6) and a pair of transfer mechanisms (66) each for transferring a known plurality of trays together and at a known separation from the respective conveyors to the heat sealing tool wherein the heat sealing tool (6) comprises a plurality of individually operable heaters (61*a*, 61*b*), each aligned with a respective tray in the tool in use. Control means is utilized to determine if a tray is missing from a group of trays transferred by the transfer mechanism. If a tray is determined as missing the control means is configured to not activate the heater aligned with the position of the determined missing tray in the tool.

14 Claims, 5 Drawing Sheets

(51) Int. Cl.
*B65B 7/16* (2006.01)
*B65B 51/14* (2006.01)
*B65B 57/04* (2006.01)
*B65B 59/04* (2006.01)
*B65B 25/00* (2006.01)
*B29C 65/18* (2006.01)
*B29C 65/78* (2006.01)
*B29C 65/00* (2006.01)

(56) References Cited

U.S. PATENT DOCUMENTS

2008/0120944 A1\* 5/2008 Rimondi .................. 53/285
2011/0023421 A1\* 2/2011 Izquierdo et al. .......... 53/477

\* cited by examiner

```
Operation:
        ╱─Sensor Tray 1
  301 ╱─Conveyor Index Forward Tray 1
  302 ╱─Sensor Tray 2
  303 ╱─Conveyor Index Forward Trays 1 & 2
  304 ╱─Sensor Tray 3
  305 ╱─Conveyor Index Forward Trays 1, 2 & 3
  306 ╱─Sensor Tray 4
  307 ╱─Conveyor Index Forward Trays 1, 2, 3 & 4
  308

╱─All Trays are Carried into the Tool by the Grippers
  309

╱─Perform Sealing of Trays 1, 2, 3 & 4
  310
```

Operation:
- 401 — Sensor Tray 1
- 402 — Conveyor Index Forward Tray 1
- 403 — Sensor Tray 2
- 404 — Conveyor Index Forward Trays 1 & 2
- 405 — Software knows 3 is OFF, Index Conveyor
- 406 — Conveyor Index Forward Trays 1, 2 & missing 3
- 407 — Sensor Tray 4
- 408 — Conveyor Index Forward Trays 1, 2, missing 3 & 4

- 409 — All Trays are Carried into the Tool by the Grippers

- 410 — Perform Sealing of Trays 1, 2 & 4

TRAY SEALING APPARATUS AND METHOD

The invention relates to tray sealing apparatus. In this context, the term "tray" means any container having an upwardly facing opening to which a film is to be heat sealed.

It is common in the food industry to package food items in heat sealed trays and this must be done at high speed in view of the high throughput required, particularly for fresh fruit. In one conventional apparatus, trays are fed along a conveyor, filled with food items and then supplied, typically in groups, to a tray sealer having a heat sealing tool. The tool has an upper, heated plate which is brought into engagement with a heat sealable film and the edge of the or each tray so as to heat seal the film to the tray(s). The tray(s) is then removed from the tray sealer.

In order to increase throughput, it is known to provide a twin lane device, an example of which is the QX-1100 manufactured and sold by Ishida Europe Limited of Birmingham, United Kingdom. In this apparatus, a pair of conveyors are provided which effectively define two tray sealing lanes. In use, trays are fed along each lane by the conveyors to the tray sealer in synchronism. Sets of trays are then transferred in parallel by respective gripper arms to the tray sealer. Film is then sealed to the two sets of trays simultaneously and the trays are then removed from the tray sealer. As will be appreciated, this effectively doubles the throughput of the single lane device.

A problem has arisen, particularly in the fresh food packaging industry, in view of the need to be able to respond very quickly to orders for packaged products of a variety of different types. Thus, a packaging firm may be asked to package a quantity (i.e. a number of trays) of one fresh food product and a quantity of a different fresh food product, those quantities being relatively small such that the need for high throughput is of lower importance. At present one solution is to use a twin lane tray sealer whereby the feed of trays to the respective lanes are balanced.

Specifically, the two lanes may be tooled for trays of different sizes but the speeds of the respective conveyors providing trays to the lifter of the sealing tool are balanced in the sense that in normal operation both sides of the lifting tool become full simultaneously. Thus, the tray sealer can be run continuously with both lanes.

For an independent twin lane machine with a common tool closing, the tool closing will be triggered by the tray feed to each lane. In particular if the dual lane sealer comprises first and second lanes A and B and lane A is full and the next tray in lane A is approaching we have to complete the machine cycle to be able to accept the next tray. This could leave lane B with a tray missing therefore the last impression will have to be switched off.

It is known in the art to manually switch of the cutting tool of a particular impression by means of a mechanical switch when a fault is detected with the knife (e.g. it has become blunt) or a heater has failed and in the meantime pushing up trays in that position must be avoided. This manual switch cannot be changed when the machine is in production. A tray can never be loaded into the impression that is switched off so the machine is subsequently always one tray short resulting in reduced production.

In a first aspect of the present invention there is provided a method of operating a twin lane tray sealer comprising a pair of conveyors aligned with respective lanes for conveying trays to a heat sealing tool; a pair of transfer mechanisms each for transferring a known plurality of trays together and at a known separation from the respective conveyors to the heat sealing tool; wherein the heat sealing tool comprises a plurality of individually operable heaters, each aligned with a respective tray in the tool in use, the method comprising determining that a tray is missing from a group of trays transferred by a transfer mechanism and not activating the heater aligned with the position of the missing tray in the tool.

In one embodiment not activating the heater aligned with the position of the determined missing tray in the tool comprises not moving the heater during tray sealing.

In another embodiment the twin lane tray sealer further comprises film supply apparatus for supplying respective heat sealable films to the sealing tool one in alignment with each tray feed lane; a pair of lower support members, each aligned with a respective one of the conveyors and on to which one or more trays can be transferred, and a common upper plate or a pair of upper plates having the heaters aligned respectively in use with each tray on the lower support members; means for selectively moving the lower support members towards the respective upper plate so as to bring the tray or trays on that lower support member into contact with the corresponding film; wherein not activating the heater aligned with the position of the determined missing tray in the tool comprises not moving that heater towards the film when a respective lower support member is moved towards the upper plate.

In another embodiment not activating the heater aligned with the position of the determined missing tray in the tool comprises not providing heat to the heater, preferably by not supplying power to the heater.

Preferably said control means comprises a tray sensor operable to detect that a tray is missing on the conveyor. The sensor in one embodiment comprises a photo detector circuit operable to detect the blocking of a light beam by a tray conveyed by said conveyor. In another embodiment said sensor comprises a weight sensor configured to detect a tray when a weight threshold corresponding to the weight of a known tray is crossed. In an embodiment said sensor is configurable such that it can be configured to detect trays of different dimensions and/or mass.

In a further embodiment said control means is operable to determine that a plurality of trays are missing and not activate the heaters aligned with the positions of the determined plurality of missing trays in the tool In a further aspect of the present invention there is provided a twin lane tray sealer comprising a pair of conveyors aligned with respective lanes for conveying trays to a heat sealing tool, a pair of transfer mechanisms each for transferring a known plurality of trays together and at a known separation from the respective conveyors to the heat sealing tool wherein the heat sealing tool comprises a plurality of individually operable heaters, each aligned with a respective tray in the tool in use, and control means operable to determine that a tray is missing from a group of trays transferred by a transfer mechanism and not activate the heater aligned with the position of the determined missing tray in the tool.

In one embodiment the step of not activating the heater aligned with the position of the determined missing tray in the tool comprises not moving the heater during tray sealing.

In another embodiment the twin lane tray sealer further comprises: film supply apparatus for supplying respective heat sealable films to the sealing tool one in alignment with each tray feed lane; a pair of lower support members, each aligned with a respective one of the conveyors and on to which one or more trays can be transferred, and a pair of upper plates having the heaters aligned respectively in use with each tray on the lower support members; means for selectively moving the lower support members towards the upper plate so as to bring the tray or trays on that lower support member into contact with the corresponding film; and not activating the heater aligned with the position of the determined missing tray in the tool comprises not moving the heater towards the film when a respective lower support member is moved towards the upper plate.

In another embodiment the step of not activating the heater aligned with the position of the determined missing tray in the tool comprises not providing heat to the heater, preferably by not supplying power to the heater.

Preferably the determination is performed utilising one or more sensors arranged to detect the absence of a tray from at least one of the conveyor lanes. In one embodiment said determination is performed with a sensor comprising a photo detector circuit operable to detect the blocking of a light beam by a tray conveyed by said conveyor. In another embodiment said determination is performed with a sensor comprising a weight sensor configured to detect a tray when a weight threshold corresponding to the weight of a known tray is crossed.

In a further embodiment said determination is performed with a sensor that is configurable such that it can be configured to detect trays of different dimensions and/or mass.

In another embodiment said determination comprises determining a plurality of trays are missing and said not activating comprises not activating the heaters aligned with the positions of the determined plurality of missing trays in the tool.

As will be appreciated aspects of the present invention provide several advantages over the prior art. For example, according to aspects of the present invention it is possible to automatically detect when a tray is missing from a last position of in the tray sealing tool and deactivate the corresponding impression (knife and heater) on the top tool of the sealer by, for example, not actuating the impression towards the respective tray position of the missing tray. Thus, the machine can continue to run despite the missing tray without interrupting a production run or having to delay one lane with respect to the other.

Embodiments of the present invention will now be described and contrasted with the prior art with reference to the accompanying drawings in which.

Figure 1:
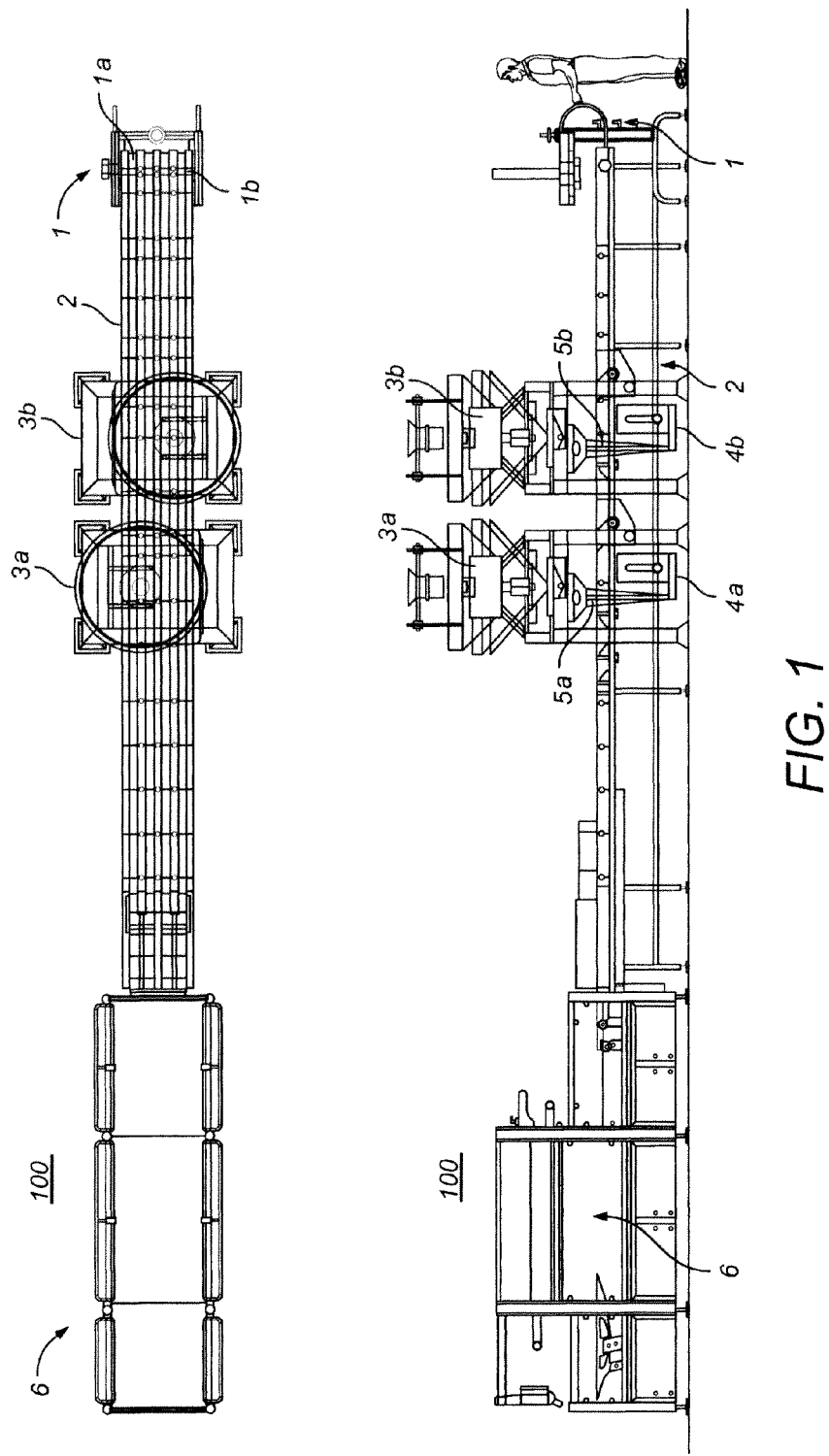
FIG. 1 is a schematic diagram of a food packaging system comprising a tray sealer according to an embodiment of the present invention.

Turning first of all to FIG. 1, there is shown a food packaging system 100 comprising a twin tray de-nester 1, a twin lane conveyor 2. Two computer combination weighers (CCWs) 3a and 3b and a tray sealer 6 are positioned along the transport path. The CCWs 3a and 3b being operable to weigh and distribute product and the tray sealer being operable to seal the trays convetyed along the transport path into which trays are conveyed from the twin lane conveyor 2 and sealed.

The food packaging system has two lanes along which trays can be conveyed, filled and sealed. The trays are typically supplied in nests and sit within respective tray cassettes of the twin tray de-nester 1. In this embodiment the tray de-nester is a scroll de-nester to minimize contact with the surface of the trays but it will be appreciated that other conventional de-nesters known in the art could alternatively be used. The trays are extracted from the first and second tray cassettes 1a and 1b of the de-nester and supplied on the conveyors 3a and 3b at regular intervals. The extracted trays are equally spaced from each other along the conveyors 3a and 3b. The twin tray de-nester 1 holds trays in respective first and second tray cassettes comprising said cassettes having trays of equal or different dimensions respectively.

The trays deposited by the de-nester 1 are transported towards the respective CCWs 3a and 3b by the twin lane conveyor 2. The lanes of the conveyor 2 pass under the respective computer combination weighers (CCWs) 3a and 3b. Each CCW 3a and 3b is configured to weigh a predetermined quantity of product. The predetermined quantity of product is selected to correspond to the dimensions of the tray in the corresponding lane over which the respective CCWs are positioned. Beneath the CCWs 3a and 3b there are positioned respective reciprocating distribution systems 4a and 4b. Each distribution system is positioned beneath a corresponding CCW and arranged such that product delivered from the CCW is received into a delivery head 5a and 5b of the distribution system. The distribution system is operable to oscillate the position of the head 5a and 5b above a passing tray in a reciprocal manner such that the product is evenly distributed across the tray. In this manner, every passing tray on the twin lanes is evenly filled with a quantity of product corresponding to the tray size being used in the respective lane.

After passing under the CCWs 3a and 3b the filled trays are transported towards the tray sealer 6. The tray sealer 6 is shown in more detail in FIG. 2.

As shown, the tray sealer 6 comprises first and second lifters 61 and 62 (corresponding to the first and second lanes of the twin conveyor 2 respectively) and a single sealing tool comprising a common plate positioned above the lifters 61 and 62. The lifters 61 and 62 have independent mechanisms permitting each lifter to be raised and lowered independently of the other which are operable to be computer controlled via software or a hardware controller. The common upper plate comprises a first and second set of impressions positioned so as to be aligned with trays carried by the first or second lifters. The sets of impressions comprise cutters tooled to fit the dimensions of a predetermined tray size being carried by the corresponding lane. First and second film feeding systems independently receive reams of film from corresponding film rolls and feed the received film under the sealing tool such that the film from the feeding systems is aligned with respective first and second lifters. In this embodiment the feeding systems comprise a set of mechanical rollers arranged to wind the reams of film from the film rolls to the desired position under the sealer to a used film roll.

Operation of the tray sealer 6 will now be described with reference to FIG. 2. Filled trays are transported along the first and second lanes of the conveyor onto corresponding lanes 66a and 66b of a spacing conveyor 66. The spacing conveyor has starts and stops to position the trays at predetermined spacing along the conveyor and the conveyor is sized to have a tray capacity equal to its corresponding tray lifter 61a or 61b respectively. After a certain amount of time has elapsed each lane 66a and 66b of the spacing conveyor 66 is filled with trays transported from the main conveyor 2. Once the intermediate conveyor is filled, first and second gripping arms (not shown) push the trays in parallel from the filled intermediate conveyor lanes 66a and 66b onto the first and second lifters 61a and 61b respectively. Simultaneously, the gripping arms also transport in parallel any trays present on the first and second lifters 61a and 61b onto respective lanes 67a and 67b of an output conveyor 67.

Once the trays have been placed on the respective lifters then the tray sealing process takes place. The trays are thereby pushed into contact with the reams of film from film rolls 64a and 64b and a corresponding impression on the lower surface of the sealing tool 62 is actuated so that it is pressed against the assembly of tray and film. The impression heats the film around the edge of the tray thereby sealing the film to the tray edge while cutters trim the film around the perimeter releasing the film from the ream. The lifters, now containing sealed trays, are then lowered back to their original position. While the tray sealing process is being performed, the lanes 66a and 66b of spacing conveyor 66 are re-filled with fresh trays. Thus, the cycle is completed with the sealed trays being moved by the gripping arms to the output conveyor 67 while the fresh unsealed trays are simultaneously transported by the gripping arms from the intermediate conveyor 66 to the tray lifters 61a and 61b.

In the illustrated embodiment, the first lane 2b has trays of smaller dimension to those in the second lane 2b such that when the equally sized lifters 61a and 61b are filled with trays the first lifter 61a will contain 5 laterally spaced trays while the second lifter 62a will contain 4 trays. In order to balance the feed of trays to the lifters 61a and 61b the first lane 2a could be running, for example, at a speed of 50 trays/minute while the second lane 2b runs at 40 trays/minute. Accordingly the tray lifter is configured to perform 10 sealing cycles per minute such that trays are sealed continuously and without interruption.

The lifters 61a and 61b are linked or controlled synchronously such that they are raised in unison during a sealing cycle. It is anticipated that the feed of trays in either lane could potentially be subject to error or interruption such that the feed becomes unbalanced. In such a scenario it is necessary to keep the machine running such that that the cycle of tray sealing is not interrupted otherwise there will be a delay leading to inefficiency if one lane is slowed down to compensate for the other or a problematic build up of trays at, for example, the second spacing conveyor 66b.

In conventional systems it is known to have a manual switch available for the deactivation of a particular impression.

The impressions corresponding to each of the tray positions are independently controllable by manual switches such that any individual impression can be switched off so that the film is not heated and cut in that position when the lifter is raised. In the example shown, the four trays at positions 68b, 68c, 68d and 68e would have their corresponding impressions activated while the impression corresponding to position 68a could be manually switched off upon ceasing production.

However, this requires that production is stopped, the problematic impression deactivated and the production restarted. This leads to delays and inefficiency in the production cycle where it is important to maintain throughput by not stopping the machine. Further there is no mechanism for recognising and dealing with an isolated incidence of a missing tray.

Figures 3A, 3B:
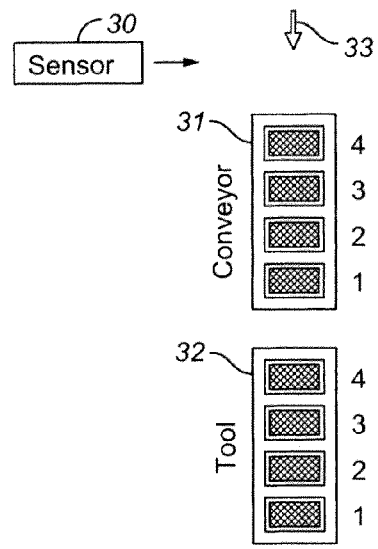
FIG. 3a shows a block diagram showing from above a representation of the content of the conveyor and sealing tool when all four trays are present.
FIG. 3b is a flow chart showing the steps performed during operation of the scenario shown in FIG. 3a to determine whether the trays are present.

In order to solve this problem, in a specific embodiment of the present invention, there is provided a sensor positioned adjacent to either or both conveyors as shown in FIG. 3a. The sensor 30 comprises, for example, a light sensor which detects the absence of a passing tray by detecting the interruption of a light beam directed across the path of the conveyor. As will be appreciated other types of position sensor could also be used such as a weight sensor or any other type of sensor or means suitable for detecting the presence or absence of a tray. The sensor 30 is preferably configurable so as to provide effective detection for a particular size or type of tray that the tray sealer is tooled for.

Figure 2:
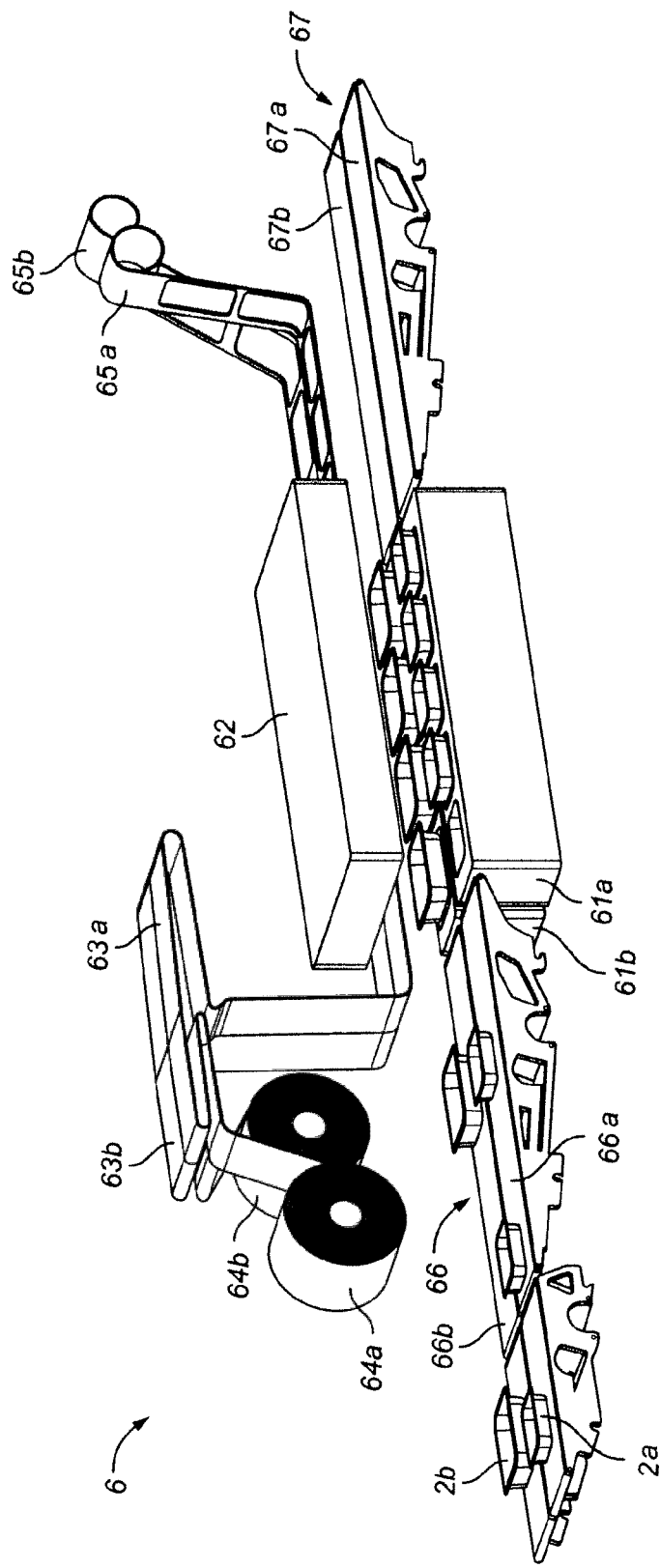
FIG. 2 is a perspective view of a dual lane tray sealer in an embodiment of the present invention in which different tray sizes are used in each lane.

The scenario shown in FIG. 3a relates to conveyor lane 2b of FIG. 2 whereby the sealing tool is tooled in that lane to receive 4 trays. The adjacent lane 2a may have similar sensing and control means, or a common sensor and control means may be used. A top down view is illustrated in FIG. 3a showing a conveyor portion 31 of the conveyor 2b with its full compliment of four trays and the sealing tool 32 after the trays have been transferred also with the full compliment of four trays. The direction of indexing of the trays along the conveyor is indicated by the arrow 33.

The flow chart of FIG. 3b shows the steps performed during operation to determine whether there are any trays missing.

In step 301 the sensor 30 performs a detection operation to determine whether the tray that is intended for position 1 (corresponding to the tray position furthest from the conveyor 31) in the sealing tool is present. The result is made available to control means (not shown) which as described below controls the activation of the impressions of the sealing tool 32.

In step 302 the conveyor indexes forward tray 1 and tray 2 comes into the position previously occupied by tray 1.

In step 303 the sensor 30 attempts to detect tray 2. In the corresponding scenario shown in FIG. 3a tray 2 is present and accordingly the tray is successfully detected and again the result is passed to the control means. Trays 1 and 2 are then indexed forward by the conveyor—step 304—and tray 3 is brought into the position previously occupied by tray 2.

The detection process is carried out for tray 3 in step 305 and as tray 3 is present trays 1, 2 and 3 and then indexed in step 306 as before such that tray 4 is brought into the position previously occupied by tray 3.

Step 307 proceeds with detection of the fourth tray by the sensor 30 in a substantially identical manner as before for the previous trays and in step 308 all the trays are indexed forwards such that they are all disposed on the conveyor portion 31 preceding the sealing tool 32.

Finally, in step 309 all of trays are carried forward to the sealing tool by the grippers. Sealing is then performed in step 310 for all four trays and the trays are then carried out of the tool by the gripper arms.

Figures 4A, 4B:
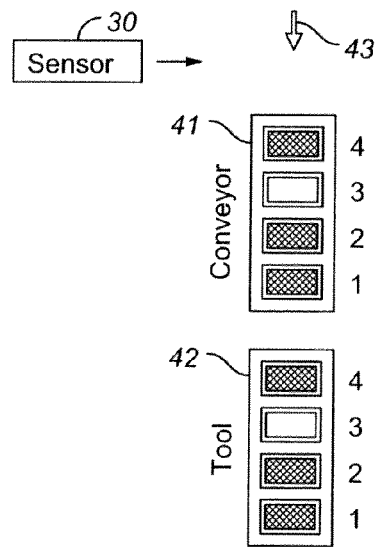
FIG. 4a shows a block diagram showing the content of the conveyor and sealing tool when a tray is missing from the third tray position.
FIG. 4b is a flow chart showing the respective steps taken to detect that the tray is missing in the scenario shown in FIG. 4a and not activate the impression for the third tray position.

Turning now to FIG. 4a, an alternative scenario is shown where the third tray is missing from the four tray sequence. A top down view is illustrated showing the conveyor 2b with a tray missing 41 and the sealing tool after the trays have been transferred with an absent tray in the tray 3 position 42. The arrow 43 indicates the direction of conveyance of the trays along the conveyor 41.

FIG. 4b is a flow chart outlining the steps performed to compensate for the missing tray. Steps 401 to 404 are performed in a similar manner as steps 301 to 304 of the previous example as trays 1 and 2 are both present on the conveyor.

However, after trays 1 and 2 are indexed forward in step 404 there is no third tray to be brought into the position previously occupied by tray 2. Accordingly in step 405 the detection process is performed and it is determined that the tray 3 is missing. The detection result is passed to the control means which upon receiving the data denoting that the tray 3 is missing and knows not to activate the impression corresponding to the third tray in the sealing tool during sealing.

This is preferably achieved by arranging the impression to not be actuated towards the film (i.e. where the assembly of tray and film would be expected if the tray were not missing) during sealing. Alternatively (or additionally) the heater of the impression can be switched off so that it is not heated, thus even if pressed towards the film the portion of the film in contact with the not activated impression is not heated.

In the next step 406 the trays 1 and two are indexed forward and tray four is brought into the position that would have been occupied by tray 3 in the previous step. Detection is carried out in step 407 and it is determined that the fourth tray is present so the control means knows to retain activation of the impression corresponding to the fourth tray (i.e. the impression will still be actuated towards the assembly of film and tray during sealing).

The trays 1, 2 and 4 are indexed forward at step 408 such that they are disposed on the conveyor portion 41 preceding the sealer in their respective positions aligned with corresponding gripper arms.

In step 409 the trays are carried by the gripper arms into the sealing tool. Finally, in step 410 sealing is performed, as the impression corresponding to tray 3 is not activated by the control means, production can continue as normal.

It is envisaged that any number of impressions could be not activated in a particular lane which is advantageous in a scenario where more that one tray is missing from one of the twin lanes when the other has its full compliment of trays.

Figure 5:
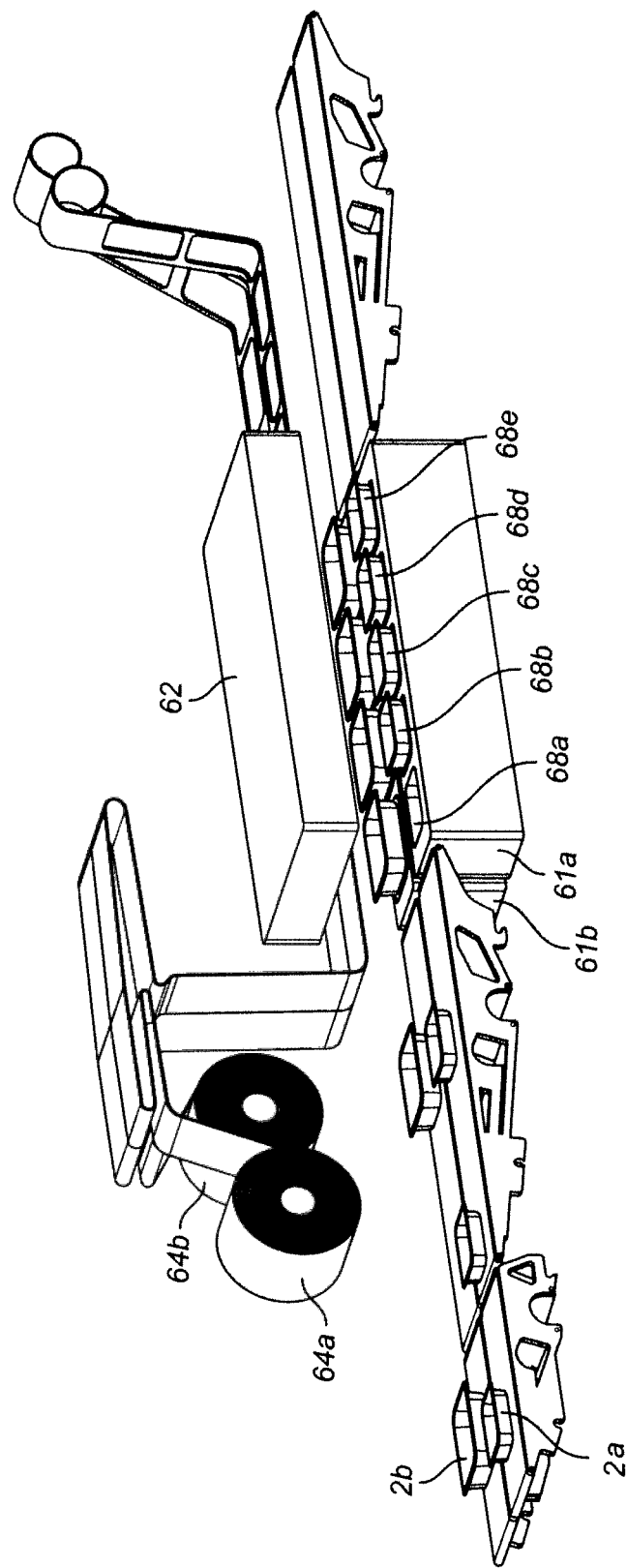
FIG. 5 is a perspective view of the dual lane tray sealer shown in FIG. 2 where the feed between the two lanes has become unbalanced resulting in a missing tray in the second lane.

FIG. 5 shows a perspective view of the tray sealer of FIG. 2 whereby a tray is missing in the last (i.e. closest to the conveyor preceding the tool) position of lane 2a. In this scenario operation would proceed in a similar manner as shown in FIGS. 4a and 4b but with the sensor detecting that tray 5 (out of 5) was missing from conveyor lane 2a.

In a further embodiment, upon refilling of the lifter with trays for the next cycle the control mechanism preferably provides control signals such that four lengths of film instead of the usual five are fed from roll 64a so that the unused film under the impression corresponding to position 68a is not wasted.

In the above embodiments the twin lane tray sealer has lifters and a sealing tool which operate together in synchronicity, however, the invention is also applicable where a single lifter is provided, for example, the QX-1100 manufactured and sold by Ishida Europe Ltd. Also, it is envisaged that the invention is equally applicable where, for example, the lifters and/or sealing tool for each lane are independently operable. Such an arrangement has the advantage of permitting an unbalanced feed of trays which can be preferable depending on the production requirements of a particular job.

Further in above described embodiments, the tray sealer is described as having a common upper plate towards which the tray lifters corresponding to each respective tray feed lane are raised. However, in other embodiments each lifter has a separate corresponding upper plate comprising. This may be preferable, for example, to simplify the manufacture of the tray sealing tool.

The invention claimed is:

1. A twin lane tray sealer comprising:
    a pair of conveyors aligned with respective tray feed lanes for conveying trays to a heat sealing tool;
    a pair of transfer mechanisms each for transferring a plurality of trays together and at a predetermined separation from the respective conveyors to the heat sealing tool wherein the heat sealing tool comprises a plurality of individually operable heaters, each aligned with a respective tray in the tool in use; and
    control means operable to determine that a tray is missing from a group of trays transferred by a transfer mechanism and not activate the heater aligned with the position of the determined missing tray in the tool; and wherein said control means comprises a tray sensor operable to detect that a tray is missing on the conveyor; and wherein said sensor comprises a weight sensor configured to detect a tray when a weight threshold corresponding to the weight of a known tray is crossed.

2. A twin lane tray sealer according to claim 1 wherein not activating the heater aligned with the position of the determined missing tray in the tool comprises not moving the heater during tray sealing.

3. A twin lane tray sealer according to claim 2 further comprising:
    film supply apparatus for supplying respective heat sealable films to the sealing tool one in alignment with each tray feed lane;
    a pair of lower support members, each aligned with a respective one of the conveyors and on to which one or more trays can be transferred, and a common upper plate or a pair of upper plates having the heaters aligned respectively in use with each tray on the lower support members;
    means for selectively moving the lower support members towards the respective upper plate so as to bring the tray or trays on that lower support member into contact with the corresponding film;
    wherein not activating the heater aligned with the position of the determined missing tray in the tool comprises not moving that heater towards the film when a respective lower support member is moved towards the upper plate.

4. A twin lane tray sealer according to claim 1 wherein said control means comprises a tray sensor operable to detect that a tray is missing on the conveyor.

5. A twin lane tray sealer according to claim 4 wherein said sensor comprises a photo detector circuit operable to detect the blocking of a light beam by a tray conveyed by said conveyor.

6. A twin lane tray sealer comprising:
    a pair of conveyors aligned with respective tray feed lanes for conveying trays to a heat sealing tool;
    a pair of transfer mechanisms each for transferring a plurality of trays together and at a predetermined separation from the respective conveyors to the heat sealing tool wherein the heat sealing tool comprises a plurality of individually operable heaters, each aligned with a respective tray in the tool in use; and
    control means operable to determine that a tray is missing from a group of trays transferred by a transfer mechanism and not activate the heater aligned with the position of the determined missing tray in the tool; and wherein said control means comprises a tray sensor operable to detect that a tray is missing on the conveyor; and wherein said sensor is configurable such that it can be configured to detect trays of different dimensions and/or mass.

7. A twin lane tray sealer according to claim 1 wherein said control means is operable to determine that a plurality of trays are missing and not activate the heaters aligned with the positions of the determined plurality of missing trays in the tool.

8. A method of operating a twin lane tray sealer comprising a pair of conveyors aligned with respective lanes for conveying trays to a heat sealing tool; a pair of transfer mechanisms each for transferring a known plurality of trays together and at a known separation from the respective conveyors to the heat sealing tool; wherein the heat sealing tool comprises a plurality of individually operable heaters, each aligned with a respective tray in the tool in use, the method comprising:

determining that a tray is missing from a group of trays transferred by a transfer mechanism; and not activating the heater aligned with the position of the determined missing tray in the tool; and wherein said determination is performed with a sensor comprising a weight sensor configured to detect a tray when a weight threshold corresponding to the weight of a known tray is crossed.

9. A method according to claim 8 wherein not activating the heater aligned with the position of the determined missing tray in the tool comprises not moving the heater during tray sealing.

10. A method according to claim 9 wherein said twin lane tray sealer further comprises:

film supply apparatus for supplying respective heat sealable films to the sealing tool one in alignment with each tray feed lane;

a pair of lower support members, each aligned with a respective one of the conveyors and on to which one or more trays can be transferred, and a pair of upper plates having the heaters aligned respectively in use with each tray on the lower support members;

means for selectively moving the lower support members towards the upper plate so as to bring the tray or trays on that lower support member into contact with the corresponding film; and wherein not activating the heater aligned with the position of the determined missing tray in the tool comprises not moving the heater towards the film when a respective lower support member is moved towards the upper plate.

11. A method according to claim 8 wherein said determination is performed utilising one or more sensors arranged to detect the absence of a tray from at least one of the conveyor lanes.

12. A method according to claim 11 wherein said determination is performed with a sensor comprising a photo detector circuit operable to detect the blocking of a light beam by a tray conveyed by said conveyor.

13. A method of operating a twin lane tray sealer comprising a pair of conveyors aligned with respective lanes for conveying trays to a heat sealing tool; a pair of transfer mechanisms each for transferring a known plurality of trays together and at a known separation from the respective conveyors to the heat sealing tool; wherein the heat sealing tool comprises a plurality of individually operable heaters, each aligned with a respective tray in the tool in use, the method comprising:

determining that a tray is missing from a group of trays transferred by a transfer mechanism and not activating the heater aligned with the position of the determined missing tray in the tool; and wherein said determination is performed with a sensor that is configurable such that it can be configured to detect trays of different dimensions and/or mass.

14. A method according to claim 11 wherein said determination comprises determining a plurality of trays are missing and said not activating comprises not activating the heaters aligned with the positions of the determined plurality of missing trays in the tool.

* * * * *